Sept. 16, 1924.

C. M. YOUNG

ILLUMINATED SIGN

Filed May 9, 1923

1,509,014

Inventor
Charles M. Young
By Louis M. Schmidt
Atty.

Patented Sept. 16, 1924.

1,509,014

UNITED STATES PATENT OFFICE.

CHARLES M. YOUNG, OF NEW BRITAIN, CONNECTICUT.

ILLUMINATED SIGN.

Application filed May 9, 1923. Serial No. 637,787.

*To all whom it may concern:*

Be it known that I, CHARLES M. YOUNG, a citizen of the United States, residing at New Britain, in the county of Hartford and State of Connecticut, have invented certain new and useful Improvements in Illuminated Signs, of which the following is a specification.

My invention relates to improvements in illuminated signs, for use as an advertising device and the like, and the object of my improvement is to produce a sign or display device comprising a combination of suitable letters or other form of display device proper and an electric light device for illuminating the same wherein a moving or changeable effect is produced by movements in the light device, and, furthermore, in which the letters or display device proper preferably comprises as the material of which the same is made an assortment of glass selected according to choice and desire of different colors and backed by a reflecting surface.

In the accompanying drawing:—

Figure 1:
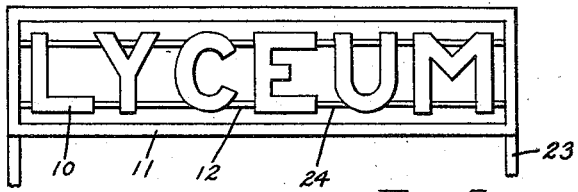
Figure 1 is a front elevation of one form of display device proper embodying my invention, comprising a group of letters with a suitable border, supported by means of a frame structure.
Figure 2:
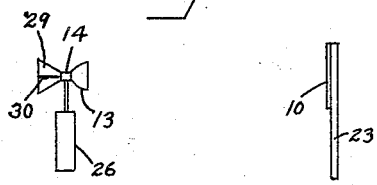
Figure 2 is a side elevation on a reduced scale of the display device and the light device.
Figure 3:
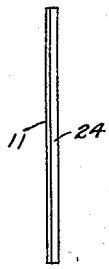
Figure 3 is a plan view of the same.
Figure 4:
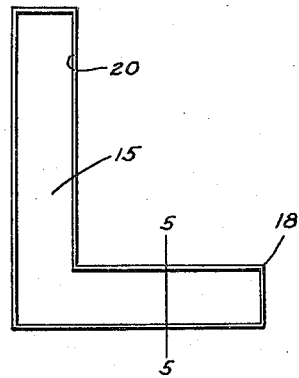
Figure 4 is a front elevation on an enlarged scale of one of the letters shown in Fig. 1.
Figure 5:
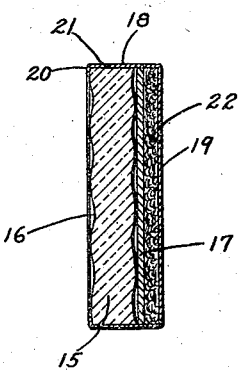
Figure 5 is a sectional view on a further enlarged scale on the line 5—5 of Fig. 4.
Figure 6:
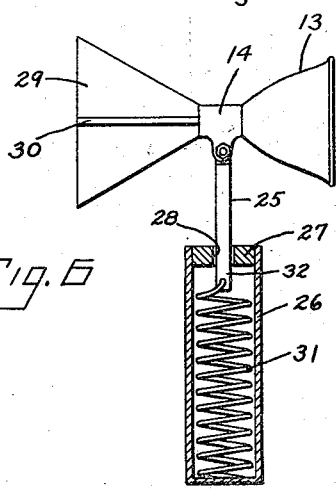
Figure 6 is a view part in side elevation and part in section of the light device and support therefor.

My improved illuminated sign comprises, as shown, a combination of a group of letters 10 that make up the word Lyceum enclosed in a border 11 and supported by means of suitable frame structure 12 that may be made of angle-iron.

Spaced from the letters 10 is an electric lamp that is housed in a suitable reflector 13 and which is positioned so as to direct the rays of light upon the sign, the lamp and reflector being supported in any proper manner from the lamp socket 14.

The letters 10 comprise the letter body 15 that is made of glass of appreciable thickness and of a selected color, and may be made of a single piece of glass or of a plurality of blocks of glass, particularly if of large size, and the front exposed face 16 may be undulating or wavy or of any desired conformation other than plain and flat.

Back of the letter body 15 is a reflective backing 17 in the form of a mirror and which, particularly for outdoor use, may be made of sheet metal that is polished and nickel-plated.

The letter 10, furthermore, comprises a container or housing structure 18 of sheet metal that is made to conform to the particular letter in each case and adapted to house the composite elements thereof, said housing 18 comprising the back wall 19, the turned edge structure 20 at the front, and the border wall 21 intermediate said back 19 and edge 20.

A cushion structure 22 may be provided intermediate the mirror 17 and the back wall 19 and this may be composed of felt, cardboard, or any other appropriate material.

The frame structure 12 comprises suitable posts or uprights 23 and cross-pieces 24.

The border 11 is a composite structure corresponding in the details as to structure to that described as being used for the letters 10.

Thus the letters 10 and border 11 are adapted for being displayed by means of the rays of light that are directed thereupon, and by reason of the irregular or variegated character of the exposed face 16 under illuminated conditions they have a distinctive effect that tends to attract attention.

The attractive features of the display devices, however, are appreciably enhanced by providing a lighting device for effecting the illumination that is of moving character, and particularly of vibratory form of movement. Also, such movement may be effected by the movements of the air. One way of doing this may be after the manner shown herewith and will be briefly described.

Referring to the socket 14, this may be supported by means of a post in the form of the stem 25. Said stem 25 is of appreciable length and extends downwardly into the interior of a cylinder 26 that has a cylinder head 27 at the upper end. The body of the stem 25 is a loose fit for the opening 28 in the cylinder head 27 through which it passes and, furthermore, these parts are of square form of cross-section so as to serve to generally position the lamp socket 14.

The lighting structure may have at the rear side of the stem 25, remote from the reflector 13, one or more directing tails or rudders, such as the vertical rudder 29 and the horizontal rudder 30.

The lighting structure described is adapted to be combined with a suitable supporting device for the stem 25 to provide under operating conditions a moving effect for the rays of light, and which may be characterized as wobbling or dancing, with a corresponding effect as to the appearance of the sign structure.

Such a supporting device I provide in the form of the coil spring 31 that is housed within the cylinder 26 and connected to the lower end portion 32 of the stem 25.

The structure described comprises essentially means for providing limited movement in both the horizontal and the vertical direction, involving a swinging movement.

Various means may be provided for producing an equivalent result, involving more or less elaborate devices, with positive bearings and a universal joint.

In some cases a battery of lighting devices may be provided for illuminating a sign and the details may be changed in other ways to suit particular circumstances.

I claim as my invention:—

1. In combination in an illuminated sign structure, a sign structure, fixedly supported, and having display characters made of material having reflective qualities and provided with an outer surface that is uneven, with alternate high and low spots or zones, and a lighting device for illuminating said sign structure positioned in spaced relation thereto, and means for operatviely supporting said lighting device adapted to effect a vibratory movement for the light rays responsive to the action of air currents.

2. In an illuminating sign structure, a sign having display characters with the exposed face portion of reflective character and with a variegated and uneven surface, a lighting structure for illuminating said sign having a lamp socket structure, a rod supporting said socket structure, a spring serving as means for supporting said rod, and means for loosely guiding said rod.

3. In combination in an illuminated sign structure, a sign proper having display devices with the exposed faces of uneven character, a lighting device, means for supporting said lighting device comprising a moving member, and said moving member having blades that are exposed to air currents for being actuated by such currents so as to effect changes in the direction of the light rays.

CHARLES M. YOUNG.